United States Patent
Chiu et al.

(10) Patent No.: US 8,096,203 B2
(45) Date of Patent: Jan. 17, 2012

(54) CHAIN TYPE TRANSMISSION ASSEMBLY

(75) Inventors: Yueh-Ling Chiu, Taichung (TW); Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 358 days.

(21) Appl. No.: 12/510,823

(22) Filed: Jul. 28, 2009

(65) Prior Publication Data

US 2011/0023641 A1  Feb. 3, 2011

(51) Int. Cl.
*F16H 55/02* (2006.01)

(52) U.S. Cl. .................................... 74/424.82

(58) Field of Classification Search ............. 74/89.23, 74/424.71, 424.81, 424.82, 424.86, 424.87, 74/424.88, 424.9; 384/45
See application file for complete search history.

(56) References Cited

U.S. PATENT DOCUMENTS

| | | | |
|---|---|---|---|
| 6,089,117 A | | 7/2000 | Ebina et al. |
| 6,176,149 B1 * | | 1/2001 | Misu ........................... 74/424.82 |
| 6,286,383 B1 | | 9/2001 | Shirai et al. |
| 6,575,632 B2 * | | 6/2003 | Kawaguchi et al. ............. 384/51 |
| 7,207,235 B2 * | | 4/2007 | Yamamoto ................. 74/424.88 |
| 7,625,120 B2 * | | 12/2009 | Pan et al. ........................ 384/51 |

\* cited by examiner

*Primary Examiner* — Vicky Johnson

(57) ABSTRACT

A chain type transmission assembly doesn't have the problem that the chain interferes with the transmission assembly, the thickness of the links of the chain of the transmission assembly is precisely calculated by an equation, so that the chain can be prevented from interfering with the outer surface of the screw, thus substantially improving the efficiency and service life of the transmission assembly.

3 Claims, 7 Drawing Sheets

CHAIN TYPE TRANSMISSION ASSEMBLY

BACKGROUND OF THE INVENTION

1. Field of the Invention

The present invention relates to a transmission assembly, and more particularly to a transmission assembly for converting rotating motion into linear motion, and the transmission assembly is provided with a chain for holding rolling elements.

2. Description of the Prior Art

To ensure that a transmission member moves at a high speed with low noise and to extend the service life of the transmission member, the transmission member is normally provided with a chain for holding rolling elements. The chain can prevent the rolling elements from impacting each other and prevent the occurrence of deviation of the rolling elements when the rolling elements move to the return path of the transmission member, thus ensuring smooth circulation while extending the service life of the transmission member.

For example, U.S. Pat. Nos. 6,089,117 and 6,286,383 disclose a transmission member which is provided with a chain. U.S. Pat. No. 6,089,117 discloses a guiding member which is provided at each end thereof with a guiding section for guiding the motion of a chain, but doesn't describe the operation of the chain within the load area (which refers to the area between the nut and the screw). Furthermore, U.S. Pat. No. 6,286,383 discloses that a threaded member is additionally engaged in the interior of the nut to guide the motion of the chain within the load area. However, none of them explain the operation of the chain within the load area. The chain of U.S. Pat. No. 6,286,383 essentially comprises the spacers 72 disposed at both sides of the rolling elements 73 and the link 71 for linking the spacers 72. Within the load area, the link 71 is located between the outer surface 52 of the screw 5 and the inner surface 62 of the nut 6. If the thickness T of the link 71 is not precisely designed with respect to the size of the screw 5 and the nut 6, the link 71 will be likely to interfere with the outer surface 52 of the screw 5 in such a manner that the link 71 presses against the outer surface 52 of the screw 5, causing friction, which will further cause distortion of the link 71. Therefore, the rolling elements 73 will be unable to abut closely against the spacers 72, as a result, stress is only applied to a single edge of the spacers 72 and accelerates the abrasion of this edge, reducing the service life of the chain. Further, it will also cause unsmooth motion of the chain or even the break of the link.

The present invention has arisen to mitigate and/or obviate the afore-described disadvantages.

SUMMARY OF THE INVENTION

The primary object of the present invention is to provide an interference-free chain for a transmission assembly.

To achieve the above object, a chain type transmission assembly accordance with the present invention comprises:

a screw defined with a helical groove on its outer surface;

a nut defined with a hole, an inner surface of the hole of the nut being formed with a helical groove which cooperates with the helical groove of the screw to define a load path therebetween, a circulating member being provided with a return path and disposed in the nut, and the return path of the circulating member being connected to the load path to form an endless circulating path;

a rolling module disposed in the endless circulating path and comprising a plurality of rolling elements and a chain, the chain including a plurality of spacers and two links, the spacers are located among the rolling elements in such a manner that between each two neighboring rolling elements is arranged one spacer, the links being located at both sides of the spacers to connecting them together, the links each have a thickness K which satisfies the below equation:

$$K \leq 2 \times \left( \sqrt{\left(\frac{PCD}{2}\right)^2 - \left(\frac{BD+S}{2}\right)^2} - \frac{D}{2} \right)$$

PCD: pitch circle diameter
S: distance between two neighboring rolling elements
D: outer diameter of the screw
BD: diameter of the rolling elements The reason why the K has to satisfy the above equation is that: when the chain performs helical motion on the surface of the screw, the movement path of the links of the chain is not in line with the PCD but will be smaller than the PCD. If the thickness of the links is not precisely designed, the links will be likely to interfere with the outer surface of the screw, causing friction, which will further cause distortion of the links. Therefore, the rolling elements will be unable to abut closely against the spacers, and as a result, it will also cause unsmooth motion of the chain. Hence, by calculating the thickness K from the above equation, the links won't interfere with the outer surface of the screw, making the chain move more smoothly.

By calculation from the above equation, the diameter of a virtual circle formed by the motion track of a center of the respective links is smaller than that formed by a center of the rolling elements, and the diameter difference between the two virtual circles:

$$H = PCD - 2 \times \sqrt{\left(\frac{PCD}{2}\right)^2 - \left(\frac{BD+S}{2}\right)^2}$$

PCD: pitch circle diameter
S: distance between two neighboring rolling elements
D: outer diameter of the screw
BD: diameter of the rolling elements
H: diameter difference between the two the virtual circles The links each have a width which is smaller than the PT (pitch) of the load path, so that the two neighboring links can be prevented from interfering with each other.

DETAILED DESCRIPTION OF THE PREFERRED EMBODIMENTS

Figure 1:
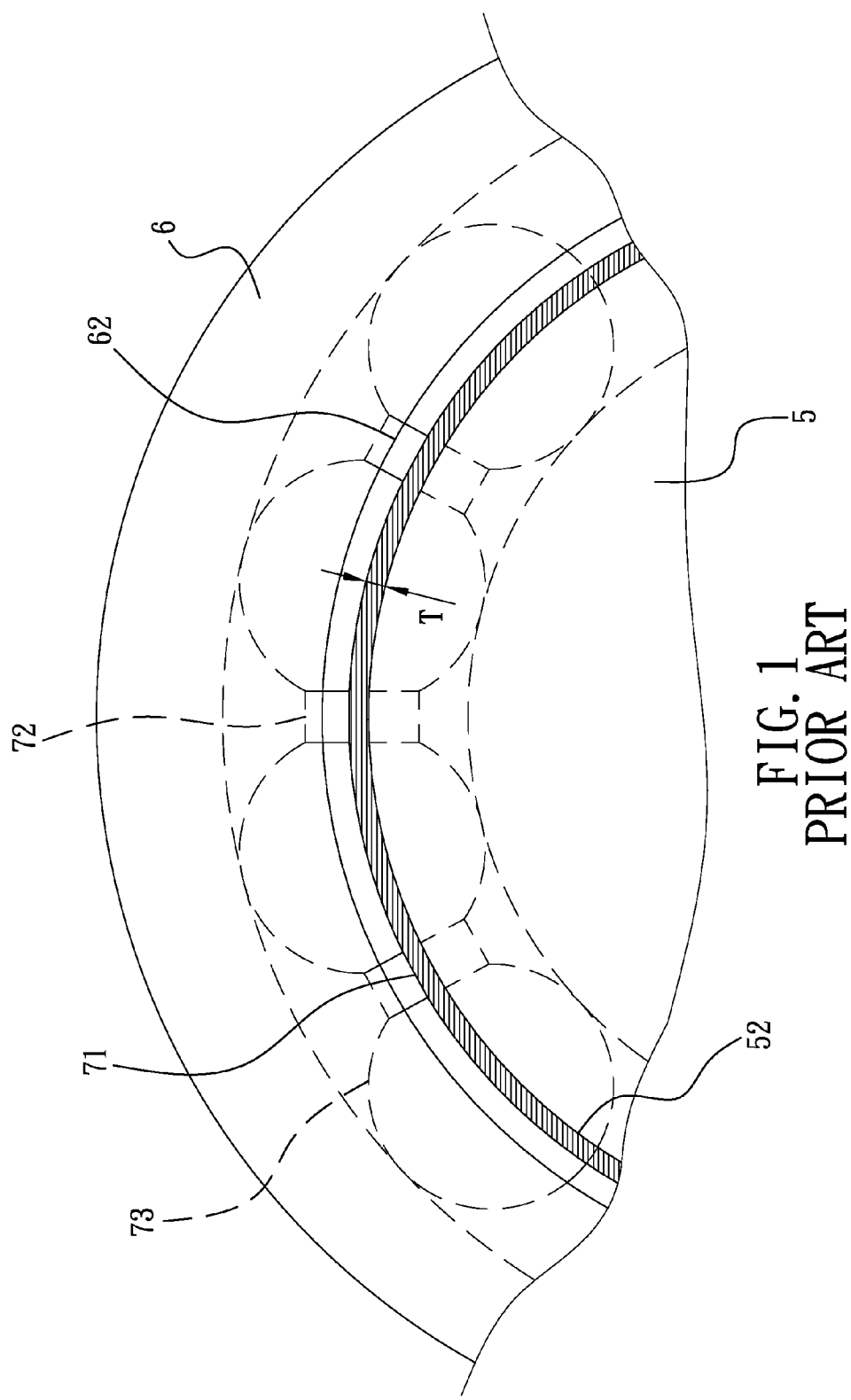
FIG. 1 shows a conventional chain type transmission assembly.
Figure 2:
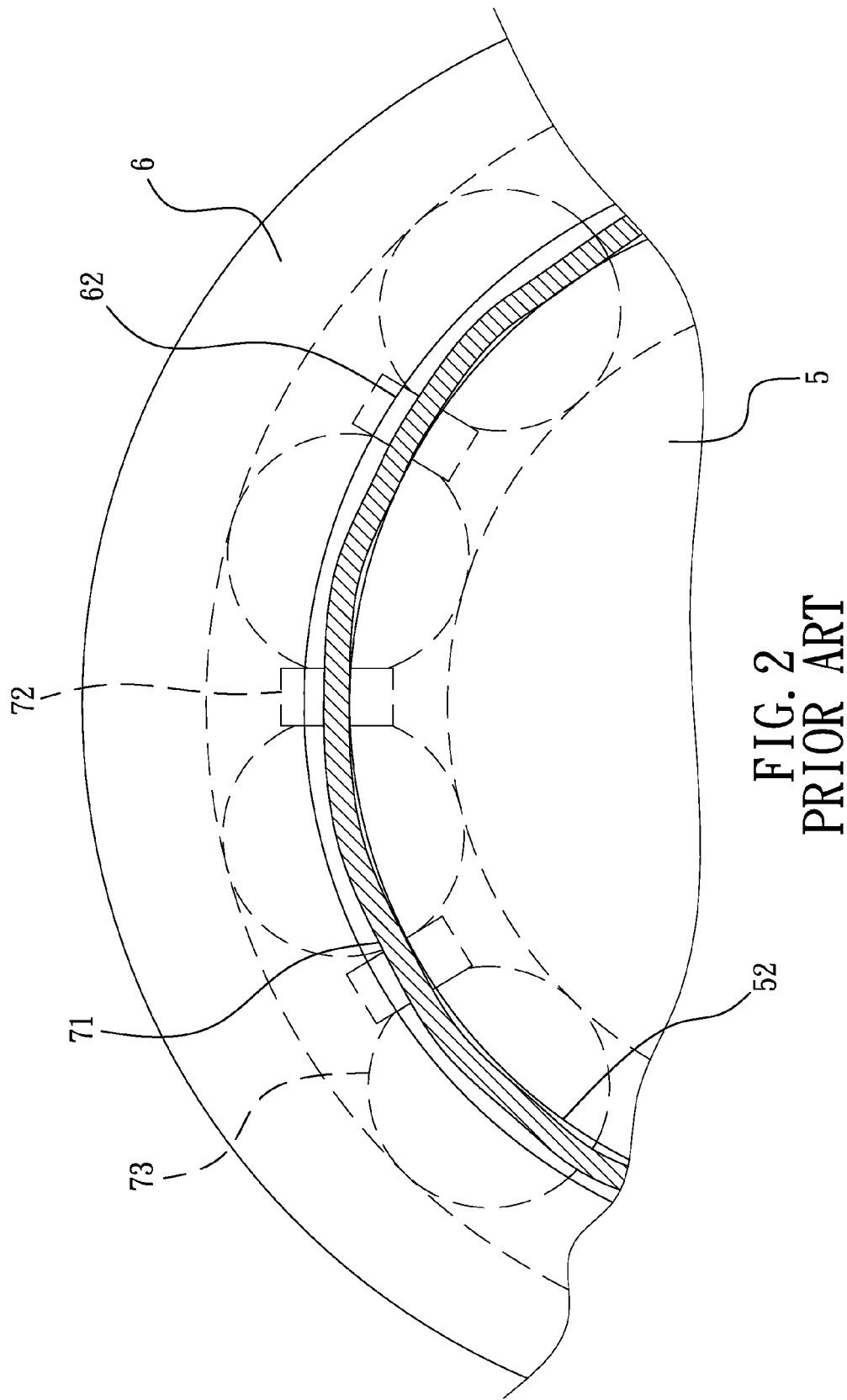
FIG. 2 shows the movement of the chain within the conventional chain.
Figure 3:
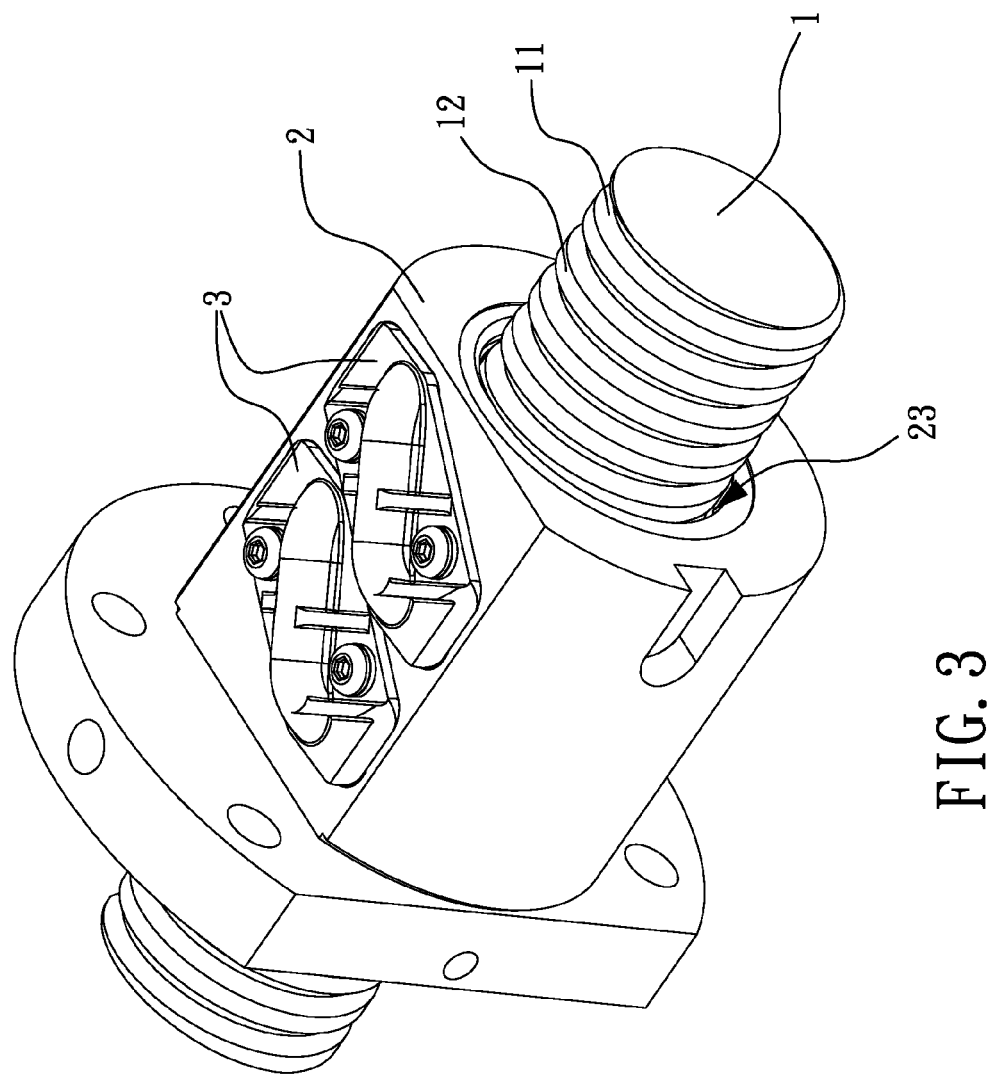
FIG. 3 is an exploded view of a chain type transmission assembly in accordance with the present invention.
Figure 4:
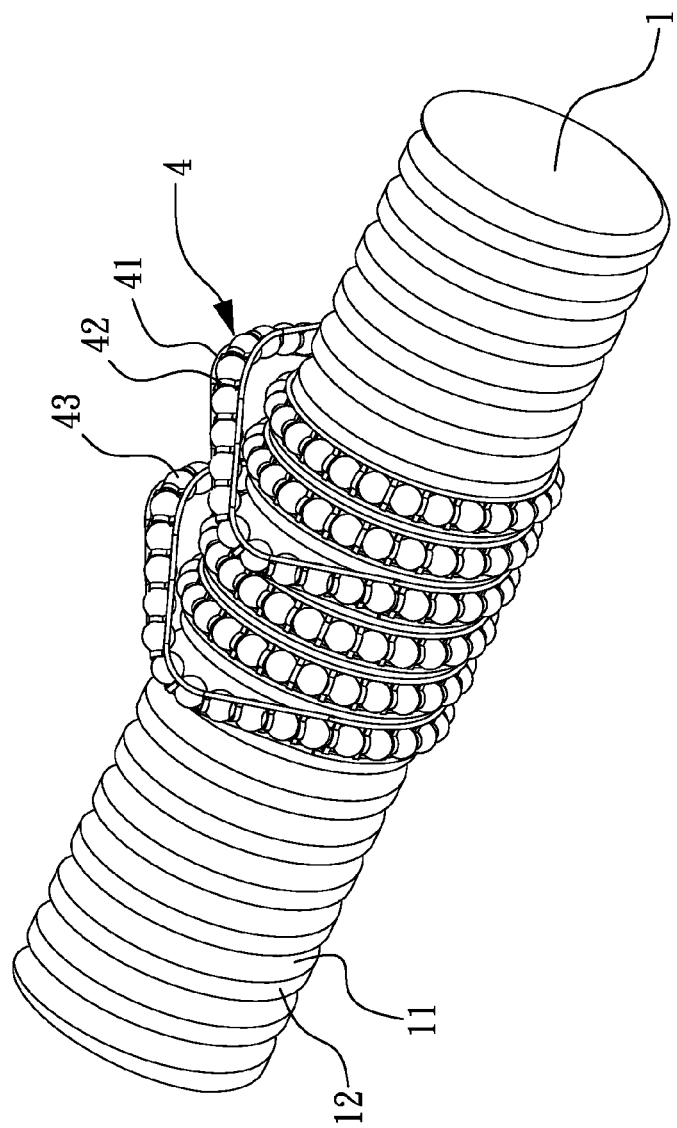
FIG. 4 is a perspective view of the chain type transmission assembly in accordance with the present invention, wherein the nut is removed.
Figure 5:
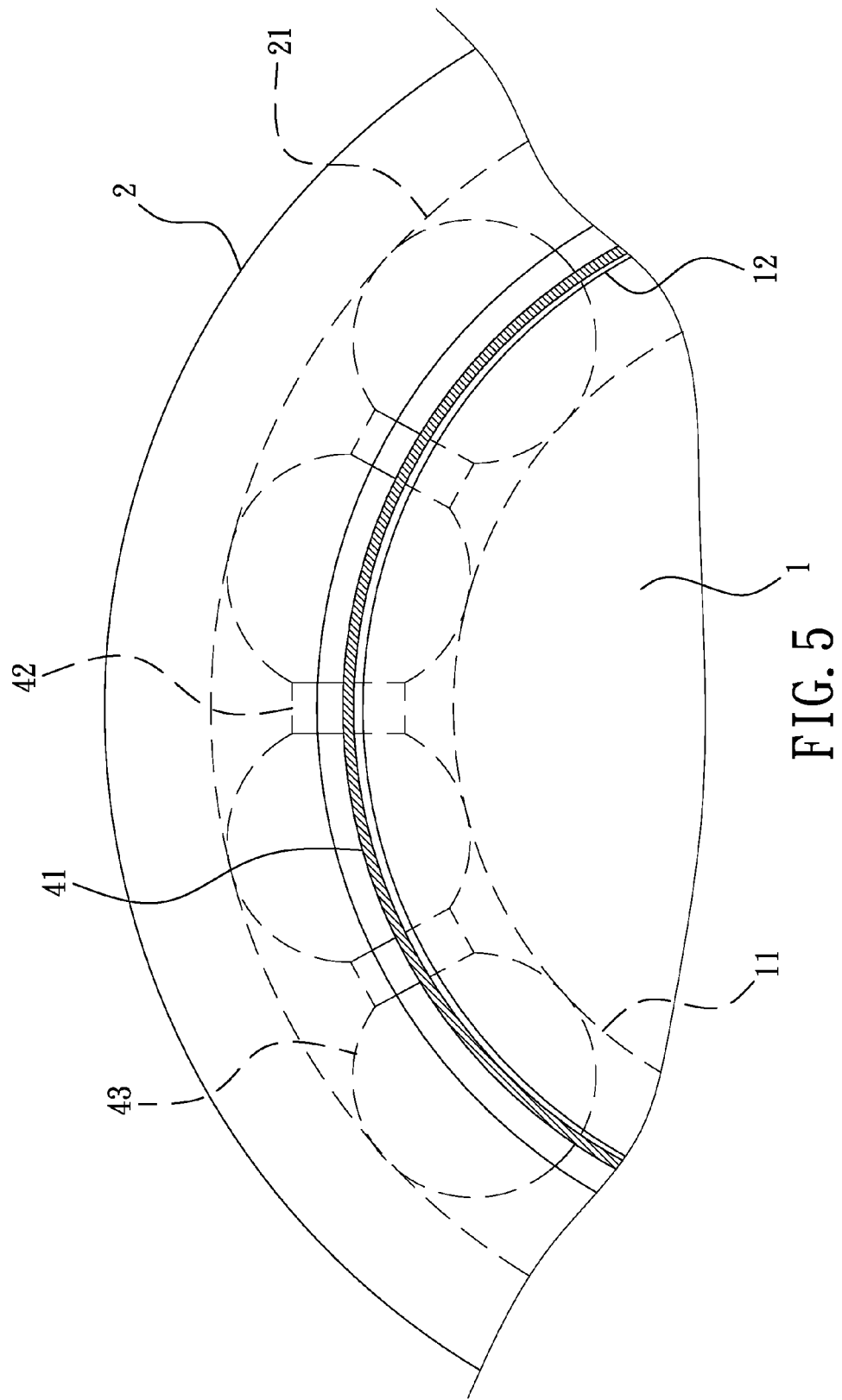
FIG. 5 shows the movement of the chain within the transmission assembly in accordance with the present invention.
Figure 6:
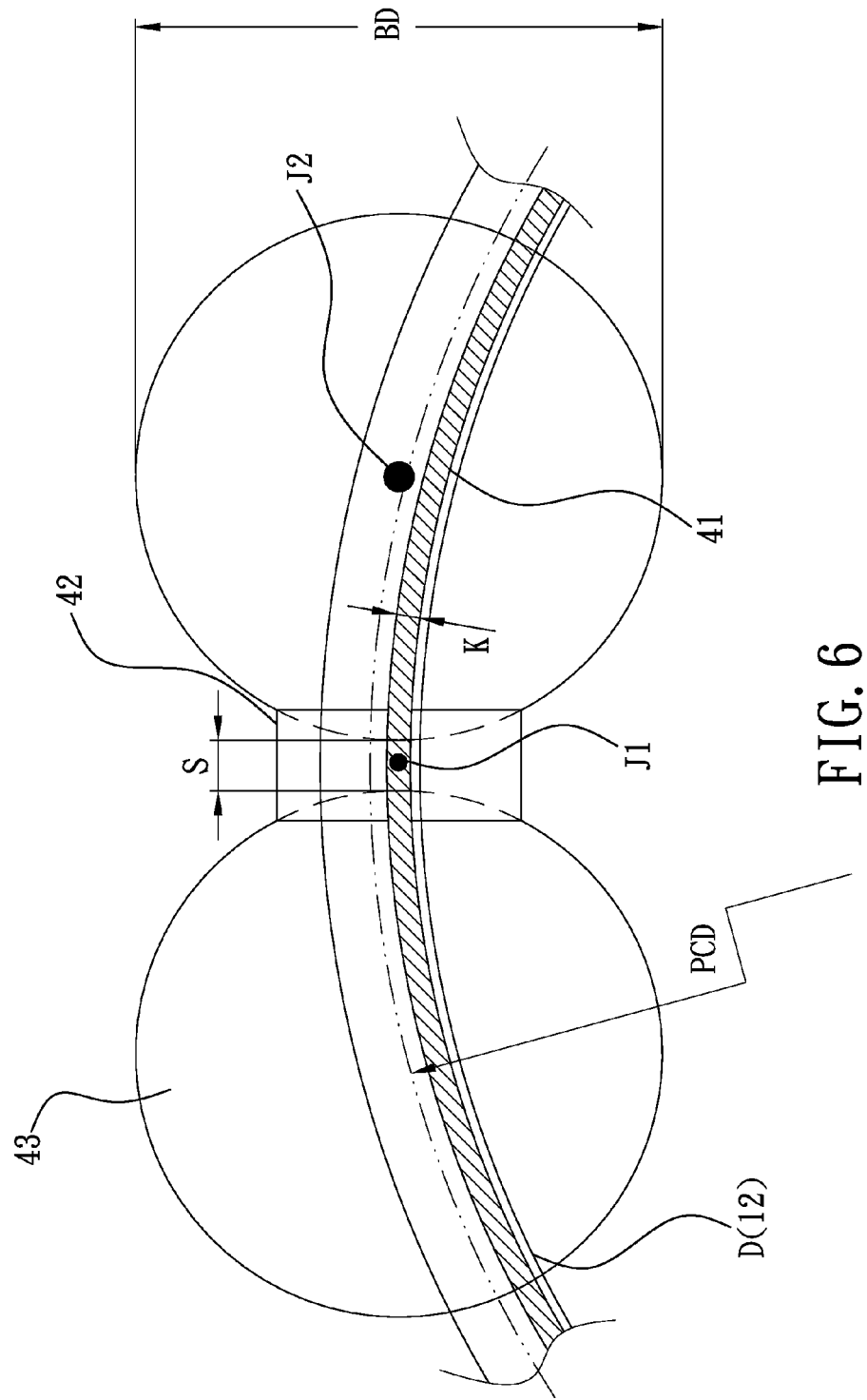
FIG. 6 is an illustrative view of the chain type transmission assembly in accordance with the present invention, showing the parameters of the equation.

The present invention will be clearer from the following description when viewed together with the accompanying drawings, which show, for purpose of illustrations only, the preferred embodiment in accordance with the present invention.

Referring to FIGS. 3-7, a chain type transmission assembly in accordance with the present invention comprises: a screw 1, a nut 2, a circulating member 3 and a rolling module 4.

The screw 1 is provided with a helical groove 11 on a surface thereof.

The nut 2 is defined with a hole 23 whose inner surface is formed with a helical groove 21 which cooperates with the helical groove 11 of the screw 1 to define a load path therebetween. The circulating member 3 is provided with a return path (not shown) and disposed in the nut 2, and the return path of the circulating member 3 is connected to the load path to form an endless circulating path.

The rolling module 4 is disposed in the endless circulating path and comprises a plurality of rolling elements 43 and a chain. The chain includes a plurality of spacers 42 and two links 41. The spacers 42 are located among the rolling elements 43 in such a manner that between each two neighboring rolling elements 43 is arranged a spacer 42. The links 41 are located at both sides of the spacers 42 to connecting them together. The links 41 each have a thickness K which satisfies the below equation:

$$K \leq 2 \times \left( \sqrt{\left(\frac{PCD}{2}\right)^2 - \left(\frac{BD+S}{2}\right)^2} - \frac{D}{2} \right)$$

PCD: pitch circle diameter
S: distance between two neighboring rolling elements
D: outer diameter of the screw
BD: diameter of the rolling elements The reason why the K has to satisfy the above equation is that: when the chain performs helical motion on the surface of the screw 1, the movement path of the links 41 of the chain is not in line with the PCD but will be smaller than the PCD. If the thickness of the links 41 is not precisely designed, the links 41 will be likely to interfere with the outer surface 12 of the screw 1, causing friction, which will further cause distortion of the links 41. Therefore, the rolling elements 43 will be unable to abut closely against the spacers 42, and as a result, it will also cause unsmooth motion of the chain. Hence, by calculating the thickness K from the above equation, the links 41 won't interfere with the outer surface 12 of the screw 1, making the chain move more smoothly.

By calculation from the above equation, the diameter of a virtual circle formed by the motion track of a center J1 of the respective links 41 is smaller than that formed by a center J2 of the rolling elements, and the diameter difference between the two (the virtual circles formed by J1 and J2) is:

$$H = PCD - 2 \times \sqrt{\left(\frac{PCD}{2}\right)^2 - \left(\frac{BD+S}{2}\right)^2}$$

Figure 7:
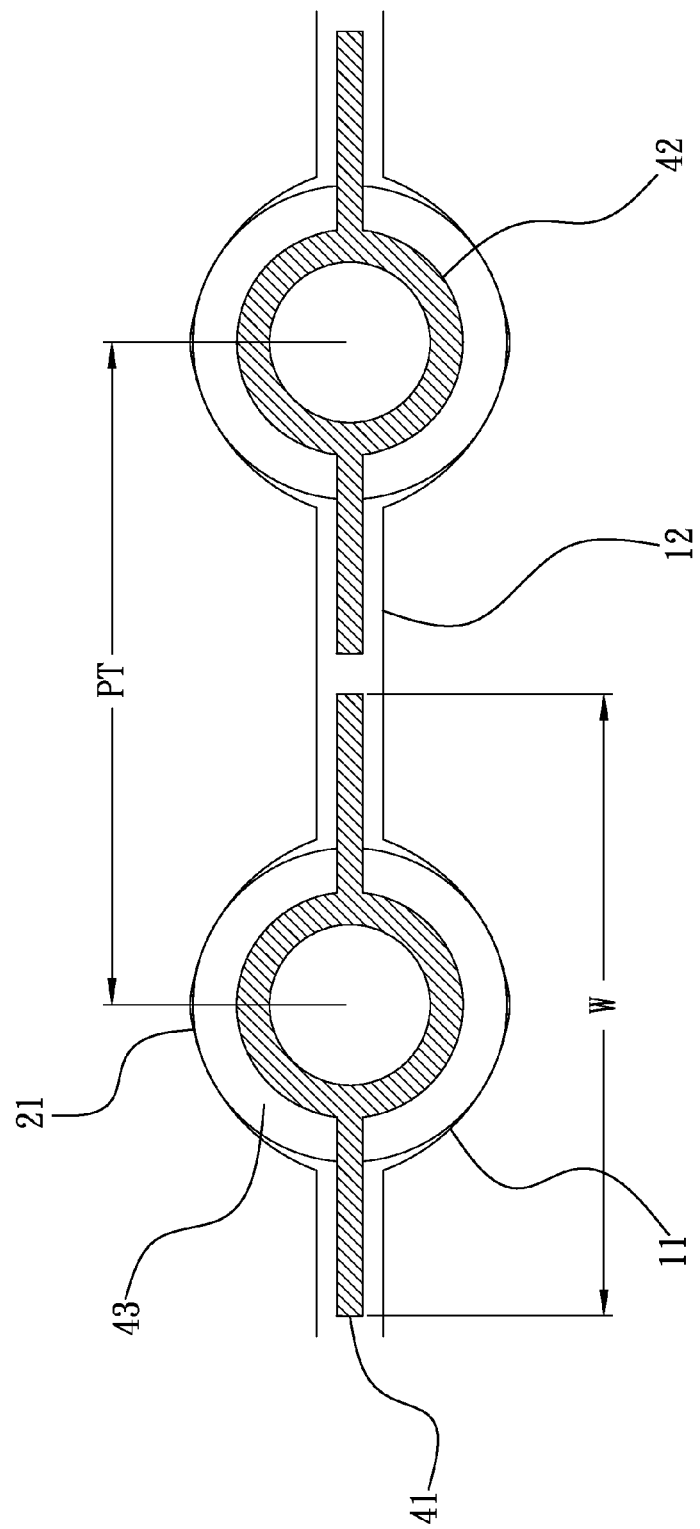
FIG. 7 is another illustrative view of the chain type transmission assembly in accordance with the present invention, showing the parameters of the equation.

PCD: pitch circle diameter
S: distance between two neighboring rolling elements
D: outer diameter of the screw
BD: diameter of the rolling elements
H: diameter difference between the two the virtual circles Referring then to FIG. 7, the links 41 each have a width W which is smaller than the PT (pitch) of the load path, so that the two neighboring links can be prevented from interfering with each other.

To summarize, by calculation from the equation, the links of the chain can be prevented from interfering with the outer surface of the screw, substantially improving the efficiency and service life of the transmission assembly.

While we have shown and described various embodiments in accordance with the present invention, it is clear to those skilled in the art that further embodiments may be made without departing from the scope of the present invention.

What is claimed is:

1. A chain type transmission assembly comprising:
a screw defined with a helical groove on its outer surface;
a nut defined with a hole, an inner surface of the hole of the nut being formed with a helical groove which cooperates with the helical groove of the screw to define a load path therebetween, a circulating member being provided with a return path and disposed in the nut, and the return path of the circulating member being connected to the load path to form an endless circulating path;
a rolling module disposed in the endless circulating path and comprising a plurality of rolling elements and a chain, the chain including a plurality of spacers and two links, the spacers are located among the rolling elements in such a manner that between each two neighboring rolling elements is arranged one spacer, the links being located at both sides of the spacers to connecting them together, the links each have a thickness K which satisfies the below equation:

$$K \leq 2 \times \left( \sqrt{\left(\frac{PCD}{2}\right)^2 - \left(\frac{BD+S}{2}\right)^2} - \frac{D}{2} \right)$$

PCD: pitch circle diameter
S: distance between two neighboring rolling elements
D: outer diameter of the screw
BD: diameter of the rolling elements.

2. The chain type transmission assembly as claimed in claim 1, wherein a diameter of a virtual circle formed by a motion track of a center of the respective links is smaller than that formed by a center of the rolling elements, and a diameter difference between the two virtual circles is:

$$H = PCD - 2 \times \sqrt{\left(\frac{PCD}{2}\right)^2 - \left(\frac{BD+S}{2}\right)^2}$$

PCD: pitch circle diameter
S: distance between two neighboring rolling elements
D: outer diameter of the screw
BD: diameter of the rolling elements
H: diameter difference between the two the virtual circles.

3. The chain type transmission assembly as claimed in claim 1, wherein the links each have a width which is smaller than a pitch of the load path.

* * * * *